United States Patent

Mickael

Patent Number: 6,064,063
Date of Patent: May 16, 2000

[54] METHOD FOR DETERMINING THERMAL NEUTRON CAPTURE CROSS-SECTION OF EARTH FORMATIONS USING MEASUREMENT FROM MULTIPLE CAPTURE GAMMA RAY DETECTORS

[75] Inventor: Medhat W. Mickael, Sugar Land, Tex.

[73] Assignee: Western Atlas International, Inc., Houston, Tex.

[21] Appl. No.: 08/965,242

[22] Filed: Nov. 6, 1997

[51] Int. Cl.$^7$ ........................................ G01V 5/10
[52] U.S. Cl. ........................................ 250/269.7
[58] Field of Search ........................................ 250/269.7

[56] References Cited

U.S. PATENT DOCUMENTS

| | | |
|---|---|---|
| 3,509,342 | 4/1970 | Dewan . |
| 4,041,309 | 8/1977 | Hopkinson . |
| 4,170,732 | 10/1979 | Randall ................................. 250/264 |
| 4,445,033 | 4/1984 | Preeg et al. . |
| 4,996,017 | 2/1991 | Ethridge . |
| 5,235,185 | 8/1993 | Albats et al. . |
| 5,777,323 | 7/1998 | Hemingway . |
| 5,808,298 | 9/1998 | Mickael ............................... 250/269.6 |

FOREIGN PATENT DOCUMENTS 0 299 823 A2   1/1989   European Pat. Off. .

Primary Examiner—Constantine Hannaher
Attorney, Agent, or Firm—Richard A. Fagin; Madan Mossman & Sriram

[57] ABSTRACT

A method for determining the thermal neutron capture cross-section of an earth formation penetrated by a wellbore from counts of capture gamma rays. The capture gamma rays are detected at spaced apart locations after bombarding the formations with high energy neutrons. The method includes determining an apparent capture cross-section at each one of the spaced apart locations from the counts of capture gamma rays, determining a difference in the apparent capture cross-sections determined between pairs of the spaced apart locations, and calculating the capture cross-section by combining the apparent capture cross-sections and the differences into an empirical relationship of known values of the capture cross-section with respect to the differences and the apparent capture cross-sections. In the preferred embodiment, the coefficients of the empirical relationship are determined by minimizing a value of an error function including as components: the differences between simulated values of the capture cross-section calculated from simulated gamma ray counts at each one of the spaced apart locations corresponding to known values of the capture cross-section used to perform the simulation, and the known values of the capture cross-section; and the statistical error in the simulated values of capture cross-section.

6 Claims, 4 Drawing Sheets

METHOD FOR DETERMINING THERMAL NEUTRON CAPTURE CROSS-SECTION OF EARTH FORMATIONS USING MEASUREMENT FROM MULTIPLE CAPTURE GAMMA RAY DETECTORS

BACKGROUND OF THE INVENTION

1. Field of the Invention

The invention is related to the field of measurement of thermal neutron capture cross-section of earth formations penetrated by a wellbore. More specifically, the invention is related to methods for determining the thermal neutron capture cross-section of the earth formations where the measurements are corrected for neutron diffusion and the effects of salinity of fluid in the wellbore.

2. Description of the Related Art

Well logging instruments known in the art for measuring the thermal neutron capture cross-section (or its inverse, the thermal neutron "die-away" or "decay" time) of earth formations include one disclosed in U.S. Pat. No. 4,041,309 issued to Hopkinson, for example. Generally, well logging instruments for measuring thermal neutron capture cross-section include a controllable source of high energy neutrons. Some types of thermal neutron capture cross-section instrument include a single gamma ray photon detector spaced apart from the source along the instrument. The source emits controlled-duration "bursts" of high energy neutrons into the earth formations surrounding the instrument. The high energy neutrons interact with atomic nuclei in the formations, decreasing in energy with such interactions until they reach the "thermal" energy level (generally defined as an average energy of about 0.025 electron volt), whereupon they may be absorbed, or "captured", by certain atomic nuclei in the earth formations which have a relatively high tendency to capture thermal neutrons. When such a nucleus captures a thermal neutron, it emits a gamma ray (called a "capture gamma ray") in response. The capture gamma rays are detected by the gamma ray photon detector. The rate at which the numbers of detected capture gamma rays decreases with respect to the elapsed time after the end of the neutron burst is related to the capture cross-section of the particular earth formation, among other things.

The thermal neutron capture cross-section as determined from the counts of gamma rays made by a single detector generally has to be corrected for the effect of the salinity of the fluid in the wellbore and for the effect of neutron diffusion. Various corrections have been devised for the single-detector type instrument based on laboratory measurements of the response of such instruments to various known salinity fluids in a simulated wellbore. Using the laboratory-derived correction methods on measurements made in an actual wellbore requires knowledge of the salinity of the wellbore fluid, which can be difficult and expensive to determine. It should be noted that it is common practice to measure the electrical resistivity of the fluid in the wellbore, but as is well known in the art, the electrical resistivity is only partially related to the concentration of sodium chloride (the salinity) in the wellbore fluid, since other chemical components may be present in the fluid which affect the overall electrical conductivity of the fluid but not its capture cross-section. The salinity of the wellbore fluid can have a pronounced effect on the measurements of capture cross-section of the earth formation because chlorine nuclei have a very high capture cross-section.

Improvements to the measurements obtained using a single-detector instrument include providing a second gamma ray detector on the instrument spaced further away from the source than is the first detector. Measurements of capture gamma rays from the second detector can be used to provide some correction to the measurements made by the first detector in determining the thermal neutron capture cross-section of the earth formations. U.S. Pat. No. 4,445,033 issued to Preeg et al describes such an instrument and a method for processing the measurements from both detectors to obtain "corrected" capture cross-section measurements. The method and apparatus described in the Preeg et al '033 patent, however, still requires knowledge of the salinity of the fluid in the wellbore.

Another two-detector technique for determining neutron capture cross-section is described in U.S. Pat. No. 3,509,342 issued to Dewan. The method described in this patent is intended to correct the capture cross-section measurements for the fractional volume of pore space ("porosity") in the earth formations. The method in the Dewan '342 patent, however, does not account for the effects of the fluid in the wellbore, which effect will vary in magnitude with respect to the salinity of the fluid in the wellbore.

Still another method for determining neutron capture cross-section is described in U.S. Pat. No. 5,235,185 issued to Albats et al. The method described in the Albats et al '185 patent uses measurements from a gamma ray detector and a detector sensitive primarily to thermal neutrons in order to provide diffusion correction to the capture cross-section measurements. The correction method described in the Albats et al '185 patent, however, requires knowledge of the salinity of the fluid in the wellbore, the size (local diameter) of the wellbore in the vicinity of the logging instrument and the porosity of the earth formation.

What is needed is a method for determining the thermal neutron capture cross-section of earth formations which accounts for neutron diffusion and does not require explicit knowledge of the salinity of the fluid in the wellbore or the porosity of the earth formations.

SUMMARY OF THE INVENTION

The invention is a method for determining the thermal neutron capture cross-section of an earth formation penetrated by a wellbore, from counts of capture gamma rays. The capture gamma rays are detected after irradiating the earth formations with bursts of high energy neutrons from a controllable, pulsed neutron source. The capture gamma rays are detected at spaced apart locations from the source. The method includes determining an apparent capture cross-section at each one of the spaced apart locations from the counts of capture gamma rays detected each location. Differences are calculated in the apparent capture cross-sections between pairs of the spaced apart locations. The neutron capture cross-section is determined by combining the apparent capture cross-section values and the difference values into an empirical relationship of known values of the capture cross-section with respect to the differences and the apparent capture cross-sections.

In the preferred embodiment of the invention, the coefficients of the empirical relationship are determined by minimizing a value of an error function including as components: the differences between simulated values of the capture cross-section calculated from simulated gamma ray counts at each one of the spaced apart locations corresponding to known values of the capture cross-section, and the known values of the capture cross-section used to make the simulation; and the statistical error in the simulated values of capture cross-section.

In the preferred embodiment of the invention, the capture gamma rays are detected at three or more spaced apart locations. The method of the invention requires capture gamma rays counts from at least two such spaced apart locations.

DESCRIPTION OF THE PREFERRED EMBODIMENT

1. Well Logging Apparatus According to the Invention

Figure 1:
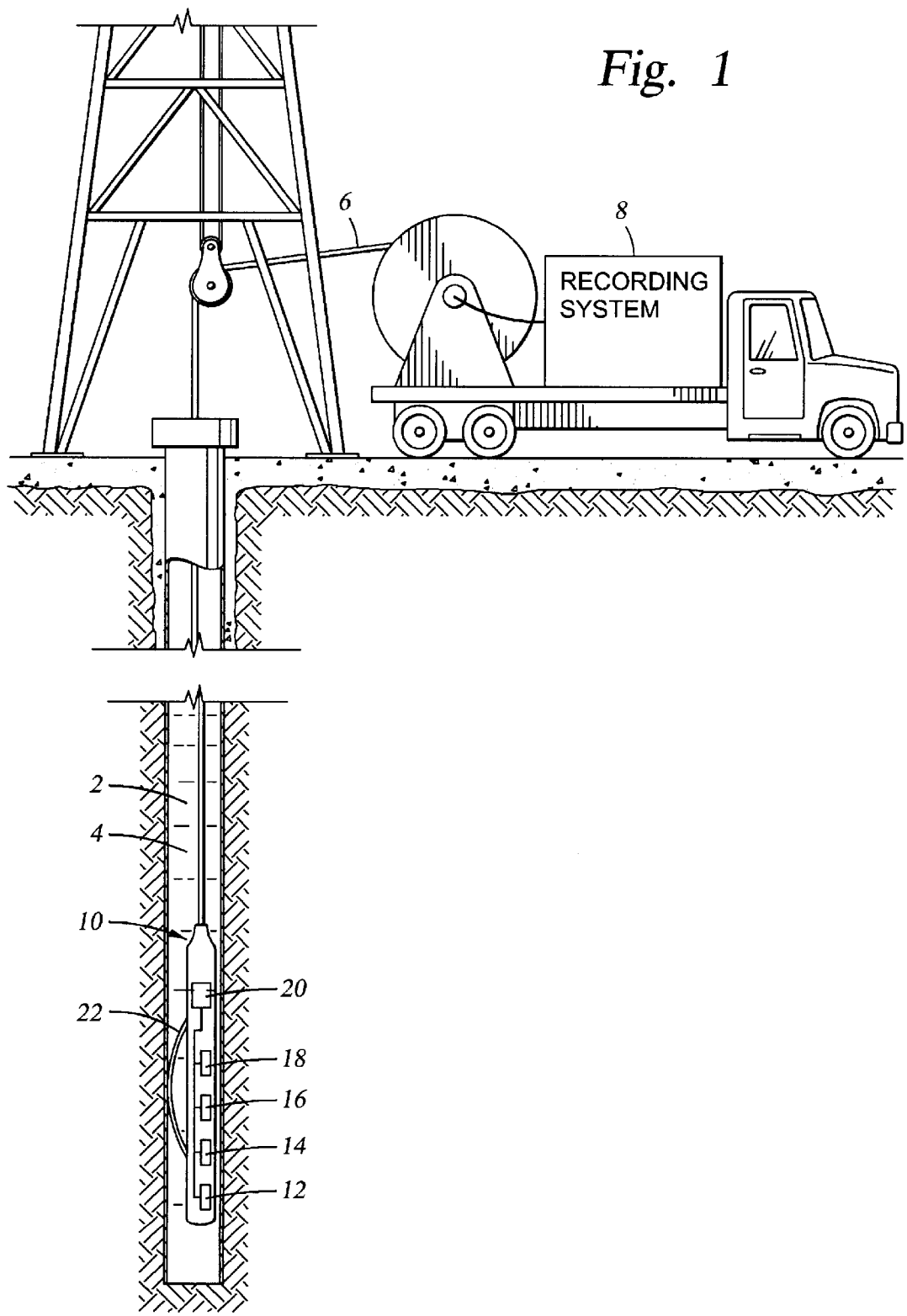
FIG. 1 shows in general form a thermal neutron capture cross-section measuring instrument according to the invention having three spaced apart gamma ray detectors.

A well logging instrument for measuring thermal neutron capture cross-section is shown generally at 10 in FIG. 1. The logging instrument 10 can be extended into a wellbore 2 attached to one end of an armored electrical cable 6. The wellbore 2 is drilled through various earth formations, shown generally at 24. The cable 6 can be extended into and withdrawn from the wellbore 2 to move the instrument 10 therethrough, by means of a spool or winch (not shown separately) forming part of a recording system 8 located at the earth's surface. The wellbore 2 is typically filled with a fluid, shown at 4, which can have varying concentrations of sodium chloride ("salinity") and other neutron absorbing substances in solution and/or suspension. The measurements made by the instrument 10 are intended to determine, among other parameters, the thermal neutron capture cross-section of the earth formations 24.

Typically the recording system 8 supplies electrical power to the logging instrument 10 over the cable 6, and signals generated by the instrument 10 are returned to the recording system 8 over the cable 6 for decoding and interpretation. The signals can be imparted to the cable 6 by a telemetry/controller unit, shown generally at 20. The telemetry/controller unit 20 stores, for communication to the cable 6, voltage pulses generated by each one of three detectors 14, 16 and 18 in response to detection of gamma rays by each detector 14, 16, 18. The telemetry/controller unit 20 can also include devices for recording the number of pulses detected by each detector for later processing at the earth's surface according to the method of this invention.

The telemetry/controller unit 20 can also provide control signals to selectively operate a "pulsed" source 12 of high energy neutrons. One such source suitable for use in the instrument 10 is described for example, in U.S. Pat. No. 4,996,017 issued to Ethridge. The source 12 in this embodiment generates controlled duration "bursts" of neutrons having an average energy of about 14 million electron volts.

The detectors can include a near detector 14, which can be a scintillation counter gamma ray photon detector having a thallium-doped sodium iodide crystal 1 inch in diameter and four inches in length, located about 13 inches from the "target" in the source 12. A center detector 16 can be a similar type scintillation counter gamma ray photon detector having its crystal located about 20 inches from the source 12 target. A far detector can be a 1 inch diameter, 6 inch long scintillation gamma detector having its crystal located about 28 inches from the source 12. The detector types, sizes and spacing described herein are only examples of combinations of detectors and their spacings from the source 12 and are not meant to limit the invention. Any other suitable gamma ray photon detector, such as a Geiger-Mueller counter, can be used for any one, or for all of the detectors 14, 16, 18. Further, it is to be clearly understood that the invention is not limited to using three gamma ray photon detectors. Three detectors 14, 16, 18 are shown in this example only to explain the method of the invention. The method of processing detector counts, which will be explained further herein, contemplates using the counts from any number of detectors, such as four, five or more, as long as there is more than one gamma ray photon detector in the instrument 10.

It should be noted that the accuracy of the results obtained using the method of this invention will be improved if a larger number of detectors is used. However, the number of detectors would be limited as a practical matter by the statistical precision of the measurements made by the detectors which are farthest away from the source 12. As is well known in the art, the statistical precision of the measurements made by a nuclear detector is generally inversely related to its distance from the source 12. As more detectors are added to the instrument, the measurements made by farther spaced detectors necessarily would have progressively lower statistical precision.

The instrument 10 is preferably urged into contact with the wall of the wellbore 2 by means of a bowspring 22 or similar eccentralizing device known in the art.

In operating the instrument 10, the telemetry/controller 20 periodically causes the source 12 to emit bursts of high energy neutrons, as previously explained. Generally after the end of each neutron burst, the detectors 14, 16, 18 detect gamma rays which enter the crystals of each detector 14, 16, 18. Each detector in turn emits a voltage pulse corresponding to each detected gamma ray. The voltage pulses can in turn be "tagged" with the time of detection with respect to the time of the neutron burst. For each detector 14, 16, 18 the numbers of detections between each neutron burst, and the times of detection, can be stored in the telemetry/controller unit 20 or transmitted to the recording unit 8 for further processing according to the invention.

2. Detector Count Processing According to the Invention

As is known in the art, the numbers of gamma rays counted by each detector 14, 16, 18 with respect to the amount of time after the end of each neutron burst is related to a number of properties of the wellbore 2 and the earth formations 24, including the thermal neutron capture cross-section ($\Sigma$) of the earth formations 24 proximal to the instrument 10, the diameter of the wellbore 2 proximal to the instrument, and the thermal neutron capture cross-section of the fluid 4 in the wellbore 2 (which is substantially, but not entirely related to the salinity of the fluid 4).

The numbers of gamma rays detected by each detector 14, 16, 18 can be used to calculate an "apparent" thermal neutron capture cross-section for each one of the detectors 14, 16, 18. A number of methods for calculating apparent capture cross-section from gamma ray counts are well known in the art. One such method, which can be used for purposes of this invention, is described in a brochure entitled, PDK-100, Western Atlas Logging Services, Houston, Tex. (1994). After calculating an apparent capture cross-section for each detector, differences between the apparent cross-section between pairs of detectors ($\Delta\Sigma$) can be calculated.

The apparent capture cross-section calculated for each detector, $\Sigma_i$, (i represents the index number of each detector and ranges from 1 to N, where N represents the total number of detectors), and the differences in the apparent capture cross-section values between pairs of detectors, $(\Delta\Sigma)_{ij}$, can be used in combination to calculate a "corrected" value, $\Sigma_c$, of the thermal neutron capture cross-section according to an empirically determined relationship:

$$\Sigma_c = \sum_{i=1}^{N} \frac{A_i + B_i \Sigma_i}{1 + C_i \Sigma_i} + \sum_{i=1}^{N} \sum_{j=i+1}^{N} \frac{D_{ij} + E_{ij}(\Delta\Sigma)_{ij}}{1 + F_{ij}(\Delta\Sigma)_{ij}} \quad (1)$$

The coefficients, A, B, C, D, E, F in the relationship defined in equation (1) can be determined by numerical simulation such as Monte Carlo modeling, as will be further explained. The actual values of the coefficients depend on the configuration of the instrument 10, which includes the sizes, spacings and types of the detectors 14, 16, 18 and the wellbore 2 diameter. The coefficients A, B, C, D, E, F can also depend on the speed at which the instrument 10 is intended to be moved through the wellbore 2, as will be further explained.

Determining the coefficients A through F for any particular configuration of the instrument 10 can be explained as follows. A numerical simulation of the response of the instrument 10 to earth formations having known values of $\Sigma$ can be performed. The numerical simulation can include an "instrument" configured substantially as described herein and as shown in FIG. 1, a simulated "wellbore" having a selected diameter, and a simulated "earth formation" having a selected value of porosity, located on one side of the instrument and in contact with the instrument. The simulated arrangement of wellbore, formation and instrument is substantially the same as shown in FIG. 1. The simulated "wellbore" is presumed to be filled with "liquid" having a selected concentration of sodium chloride (or alternatively a known value of capture cross-section). The pore spaces of the simulated earth formation are filled with a simulated "fluid" having a selected value of salinity, or known value of capture cross-section. Similarly, the apparent mineral composition of the earth formation can be selected from among known mineral compositions for earth formations.

For each set of selected values of porosity, formation mineral composition, and formation fluid salinity (or fluid capture cross-section), the "earth formation" thus simulated will have a so-called "intrinsic" value of capture cross-section which represents the fractional contribution to the capture cross-section of the rock minerals and the fluid in the pore spaces. The "intrinsic" value of capture cross-section is independent of the response of the simulation "instrument" as affected by neutron diffusion or wellbore salinity. The actual response of the simulation instrument to "real" conditions including variations in the salinity of fluid in the simulation wellbore is determined by simulating the response of the entire simulated system described above using various values for wellbore diameter and wellbore fluid salinity (or capture cross-section).

The selected parameters can be used with Monte Carlo simulation or any similar numerical simulation method to generate synthetic capture gamma ray count rates for each one of the "detectors" on the simulation "instrument". Each numerical simulation using a particular group of selected parameters can be referred to as a parameter set. The synthesized capture gamma ray count rates can then be used to calculate an apparent value of $\Sigma$ which would obtain at each detector 14, 16, 18 for each parameter set. The method described in the PDK-100 reference, supra, can be used to calculate apparent capture cross-section values for each simulated detector for each parameter set.

This simulation of capture gamma ray count rates and calculation of apparent capture cross-section ($\Sigma$) values can be repeated for a large number of different values for each of the above listed parameters from within ranges of values of each parameter generally known to exist. The values used in testing the method of the invention are described below in Table 1.

TABLE 1

| PARAMETER | VALUES SELECTED |
|---|---|
| Formation Porosity | 0, 10, 20, 30, 40 p.u. |
| Formation Fluid Salinity | 0, 50, 100, 200, 300 kppm |
| Formation Mineral Composition | Limestone, Sandstone, Dolomite |
| Wellbore Diameter | 6, 8.5, 12.25 inches |
| Wellbore Fluid Salinity | 0, 50, 100, 200, 300 kppm |

After the apparent capture cross-section values for each "detector" are determined for parameter sets, each parameter set consisting of a possible combination of the parameters shown in Table 1, the coefficients for equation (1) can be determined.

The coefficients can be determined for the condition where the sum of regression errors and statistical errors is minimized for all the simulated parameter sets. The regression error is related to the difference between the value of capture cross-section calculated according to equation (1), and the "intrinsic" value of capture cross section of the simulated earth formation for the particular parameter set simulated. The statistical error is related to the standard deviation of the capture cross-section value calculated by equation (1). The values of the coefficients are adjusted until the sum of the errors reaches a minimum. The coefficients can be determined when the error function is minimized using a least-squares model. The error function to be minimized, $\chi$, can be represented by the expression:

$$\chi^2 = \frac{1}{M - L - 1} \sum_{j=1}^{M} (\Sigma^j - \Sigma_c^j)^2 + \sigma^2(\Sigma_c^j) \quad (2)$$

where M represents the total number of parameter sets for which synthetic gamma ray count rates were simulated, L represents the number of coefficients in the particular "model" (which can be six for each detector according to equation (1)), $\Sigma^j$ represents the intrinsic value of thermal neutron capture cross-section of the earth formation for the j-th parameter set sampled, and $\Sigma_c^j$ represents the value of thermal neutron capture cross-section calculated according to equation (1). $\sigma^2(\Sigma_c^j)$ represents the standard deviation of the capture cross-section values calculated according to equation (1). The size of the standard deviation will depend on, among other things, the values of the coefficients (A through F above), the actual gamma ray counting rates at each detector, the equivalent speed of motion of the simulation instrument 10 along the wellbore 2, and whatever type of filtering has been applied to the counting rates. In the results to be shown herein, the calculations are based on a simulated speed of motion of 20 feet per minute, four count rate samples are provided for each foot traversed, and the data are smoothed using an 11-point (2.5 foot length interval) Gaussian filter. It should be noted that the coefficients calculated by minimizing the error function in equation (2) depend on the intended speed of motion of the logging instrument 10 through the wellbore 2 during logging operations. If a different a different logging speed is intended, the coefficients may be recalculated to provide optimum results for the different logging speed. In particular, a slower logging speed will generally provide decreased standard deviation, corresponding to increased statistical precision. The coefficients can be recalculated to provide improved accuracy of the values of capture cross-section when a slower intended logging speed is used to simulate the detector count rates.

In minimizing the error function of equation (2), any case where the intrinsic value of $\Sigma$ differed from the apparent capture cross-section at the far detector by more than 6 c.u. was not considered in determining the coefficients. The reason is that in the situation where the capture cross-section of the fluid in the wellbore is less than or equal to the capture cross-section of the earth formations, the gamma rays detected by the detectors will be predominantly from the wellbore. Capture gamma rays emanating from the faster-decaying earth formations will generally not be observable in this case because of the very large relative number of gamma rays emanating from the wellbore. This phenomenon is well understood by those skilled in the art.

The coefficients thus determined for any arrangement of source and detectors in an actual well logging instrument, such as shown in FIG. 1, can be used during well logging operations to calculated corrected values of thermal neutron capture cross-section from the capture gamma ray counting rates measured by each detector. It should be noted that the calculations of capture cross-section made according to the invention may be done at any time after the gamma ray count rates are measured, either in the recording system 8 or in any computer capable of being programmed to perform the calculations according to equation (1).

3. Simulation Results

Using the parameter values shown in Table 1, an apparent statistical precision of the capture cross-section measurements for each detector (14, 16, 18 in FIG. 1) was calculated. It should be noted that the results to be discussed below are based only on numerical simulation of the instrument response in a 6 inch diameter wellbore, but in testing the method of the invention the other two wellbore diameters shown in Table 1 were also used, and the results obtained were similar to those described below.

Figure 2:
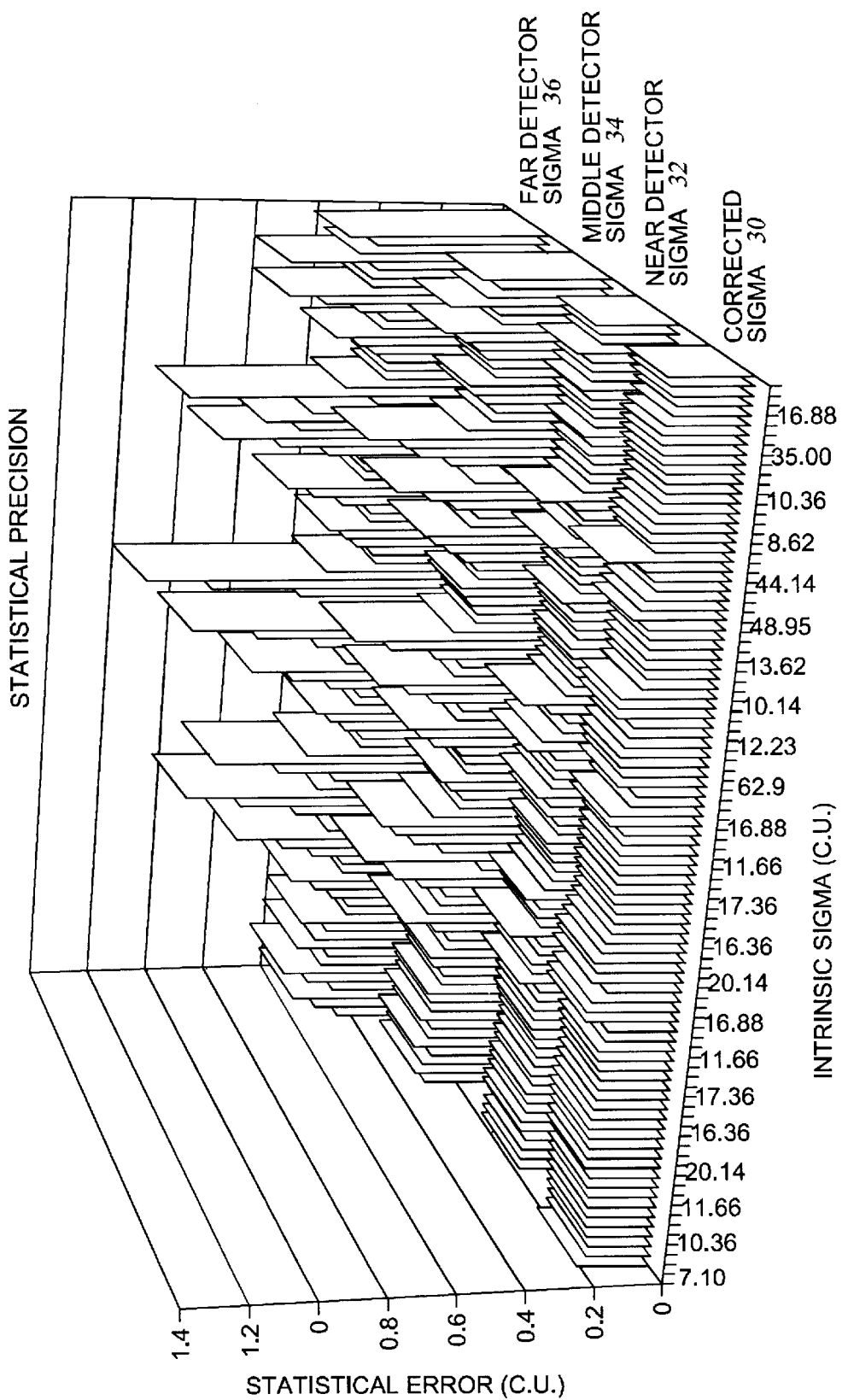
FIG. 2 shows a graph of the calculated statistical precision of the apparent capture cross-section measurements made by each detector on the instrument of FIG. 1, as well as the statistical precision of the capture cross-section measurements made by the method of the invention.

The statistical precision of the apparent capture cross-section for each parameter set is shown in FIG. 2 for the far detector (18 in FIG. 1) at 36, the center detector (16 in FIG. 1) at 34, and the near detector (14 in FIG. 1) at 32. The coordinate axis of the graph in FIG. 2 represents the "intrinsic" capture cross-section of the earth formation resulting from the values of the parameters in each parameter set. As is understood by those skilled in the art, the statistical precision of the apparent capture cross-section measurements is generally inversely related to the distance between the individual detector and the neutron source (12 in FIG. 1). The statistical precision of the capture cross-section calculated according to equation (1) after optimization of the coefficients is shown in FIG. 2 at 30. As can be observed in FIG. 2, the statistical precision of the results according to the method of the invention are improved even over the statistical precision of the measurements from the near detector (14 in FIG. 1).

Figure 3:
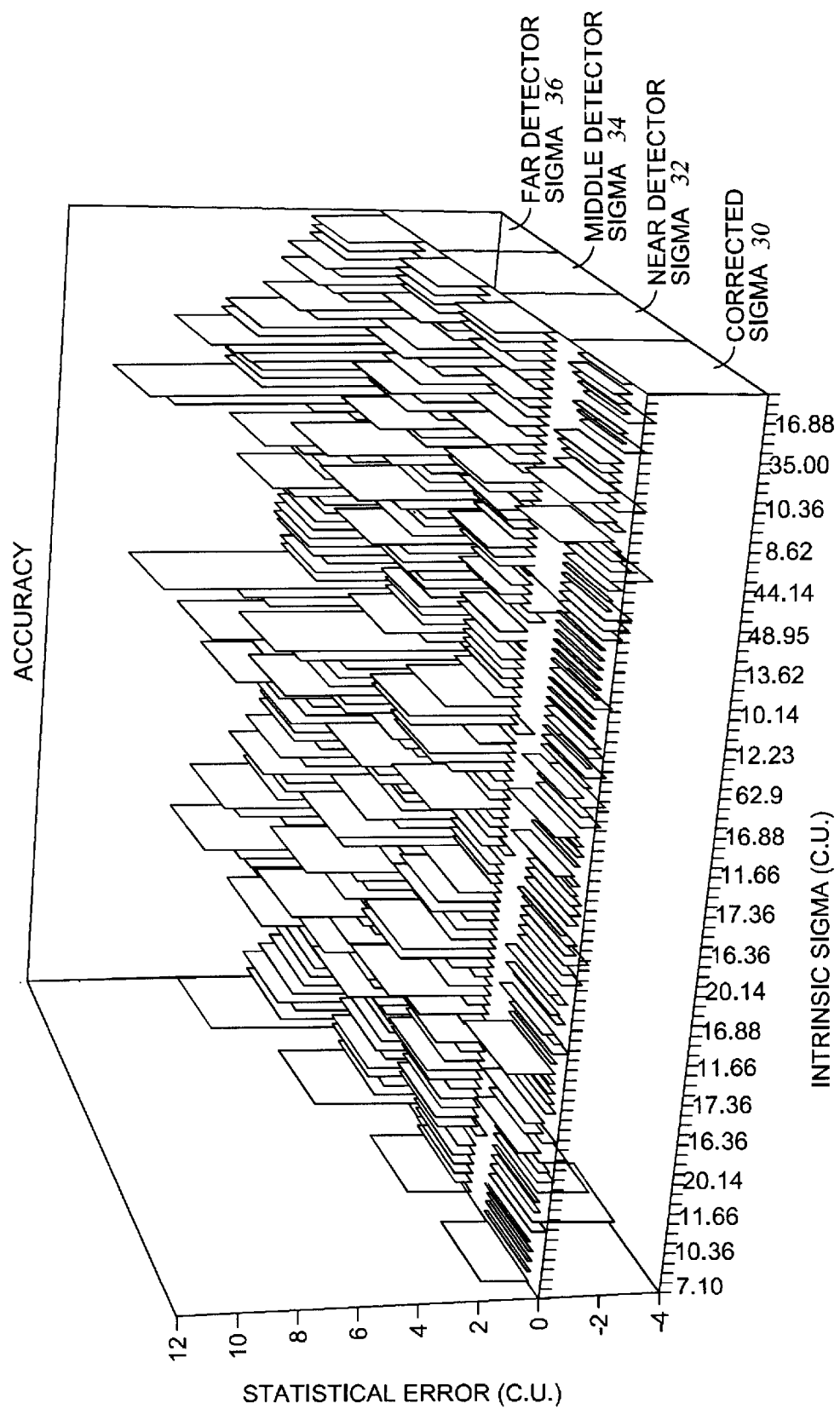
FIG. 3 shows a graph of the calculated accuracy of the capture cross-section measurements made by each detector on the instrument of FIG. 1, as well as the accuracy of the capture cross-section measurements made by the method of the invention.

FIG. 3 shows a graph of the accuracy of the measurements of $\Sigma$ for each detector for each parameter set. The accuracy represents the difference between the $\Sigma$ value calculated according to prior art methods from the counts at each detector, and the intrinsic value of $\Sigma$. The accuracy of the measurements made by the near detector shown at 46 are the least accurate since they are the most affected by the wellbore fluid salinity. Conversely, the measurements from the far detector shown at 42 are the most accurate as they are the least affected by the fluid in the wellbore. The center detector accuracy shown at 44, falls between that of the near and far detector accuracies. The accuracy of the result calculated according to equation (1) after determination of the coefficients is shown at 40. The accuracy of the results is improved over that of the far detector, even while the statistical precision is improved over that of the near detector as shown in FIG. 2.

Figure 4:
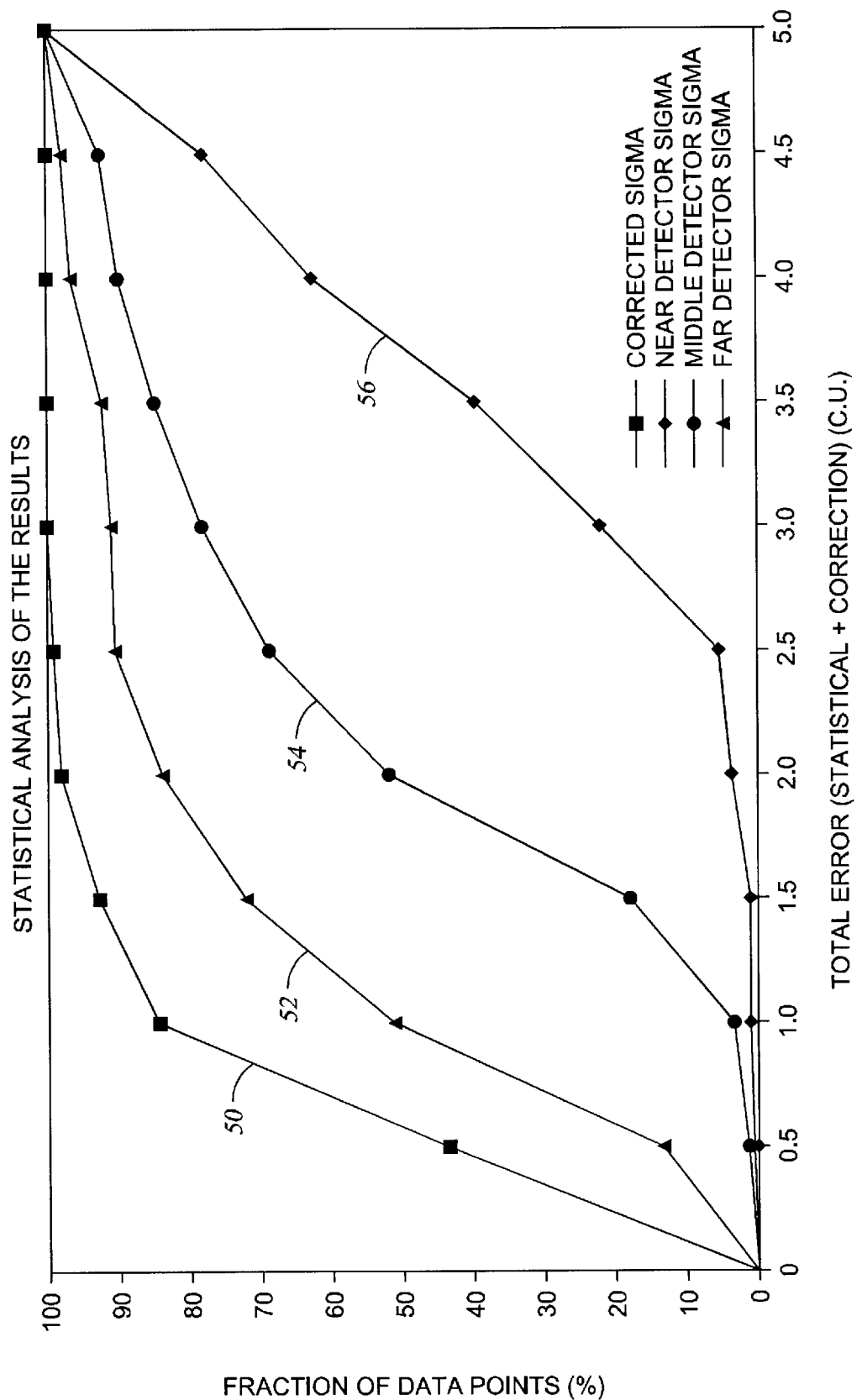
FIG. 4 shows a graph of the fraction of the total number of apparent capture cross-section measurements which have less than a specified amount of total error for each of the detectors on the instrument shown in FIG. 1, as well as the number of capture cross-section measurements which have less than a specified amount of total error for the measurements made according to the invention.

The graph in FIG. 4 shows the number of measurements having a combined error (sum of statistical and accuracy error values) less than the amount shown on the coordinate axis. For the method of the invention, shown at 50, 90 percent of the $\Sigma$ measurements have a combined error less than 1.5 capture units (c.u.). For the far detector, the 90 percent level occurs only within a total error of 3 c.u. For the near detector, the 90 percent level occurs only at nearly 5 c.u. total error.

The invention provides improved accuracy and statistical precision in determining thermal neutron capture cross-section of an earth formation without explicit knowledge of the salinity of the fluid in the wellbore, or knowledge of the porosity of the earth formation, as required in prior art methods.

Those skilled in the art will devise other embodiments of this invention which do not depart from the spirit of the invention as disclosed herein. Therefore the invention should be limited in scope only by the attached claims.

What is claimed is:

1. A method for determining thermal neutron capture cross-section of earth formations from counts of capture gamma rays detected at spaced apart locations after irradiating said formations with bursts of high energy neutrons, the method comprising:

determining an apparent capture cross-section at each one of said spaced apart locations from said counts of capture gamma rays;

determining differences in said apparent capture cross-sections between pairs of said spaced apart locations; and determining said thermal neutron capture cross-section by combining said differences and said apparent capture cross-sections according to an empirical relationship relating known values of said apparent capture cross-section to values of said differences and values of said apparent capture cross-section;

wherein coefficients of said empirical relationship are determined by minimizing an error function comprising:

(i) differences between values of thermal neutron capture cross-section calculated according to said empirical relationship from simulated gamma ray counts at each one of said spaced apart locations using known values of capture cross-section for said simulation, said known values of said thermal neutron capture cross-section used for said simulation, and (ii) statistical error in said calculated values of capture cross-section.

2. The method as defined in claim 1 wherein said error functions is minimized according to a least squares relationship.

3. The method as defined in claim 1 wherein said coefficients are determined for a selected speed of motion for a well logging instrument through said earth formations.

4. A method for determining thermal neutron capture cross section of earth formations penetrated by a wellbore, comprising:

irradiating said earth formations with bursts of high energy neutrons;

counting capture gamma rays between said bursts at spaced apart locations from a position at which said burst emanate;

determining an apparent capture cross-section at each one of said spaced apart locations from said counts of capture gamma rays;

determining differences of said apparent capture cross-sections between pairs of said spaced apart locations; and determining said thermal neutron capture cross-section by combining said differences and said apparent capture cross-sections according to an empirical relationship relating known values of said thermal neutron capture cross-section to values of said difference and values of said apparent capture cross-section;

wherein coefficients of said empirical relationship are determined by minimizing a value of an error function comprising:

(i) differences between values of thermal neutron capture cross-section calculated according to said empirical relationship from simulated gamma ray counts at each one of said spaced apart locations using known values of capture cross-section for said simulation, and said known values of said thermal-neutraon capture cross-section used for said simulation, and (ii) statistical error in said calculated values of capture cross-section.

5. The method as defined in claim 4 wherein said error function is minimized according to a least squares relationship.

6. The method as defined in claim 4 wherein said coefficients are determined for a selected speed of motion of a well logging instrument through said earth formations.

* * * * *